(12) United States Patent
Lei et al.

(10) Patent No.: US 10,713,509 B1
(45) Date of Patent: Jul. 14, 2020

(54) PARKING ASSIST SYSTEM WITH PARKING SPOT OCCUPANCY READOUT

(71) Applicant: FORD GLOBAL TECHNOLOGIES, LLC, Dearborn, MI (US)

(72) Inventors: Oliver Lei, Windsor (CA); Brian Bennie, Sterling Heights, MI (US); Allen R. Murray, Lake Orion, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 16/256,233

(22) Filed: Jan. 24, 2019

(51) Int. Cl.
| | |
|---|---|
| *B60Q 1/48* | (2006.01) |
| *G06K 9/00* | (2006.01) |
| *G08G 1/14* | (2006.01) |
| *G06F 16/29* | (2019.01) |
| *G01C 21/36* | (2006.01) |
| *B60R 1/00* | (2006.01) |

(52) U.S. Cl.
CPC .......... *G06K 9/00812* (2013.01); *B60R 1/00* (2013.01); *G01C 21/3685* (2013.01); *G06F 16/29* (2019.01); *G08G 1/143* (2013.01); *B60R 2300/806* (2013.01)

(58) Field of Classification Search
CPC .... G06K 9/00812; G06F 16/29; G08G 1/143; G08G 1/166; G08G 1/168; G01C 21/3685; B60R 1/00; B60R 2300/806; B60R 2300/105; B60R 2300/207; B62D 15/0275; B60T 2201/10; B60W 30/06; B60W 10/20; B60W 10/18; B60W 50/14; B60W 2554/00; B60W 2050/146; B60W 2555/00

USPC .......... 340/932.2, 937, 425.5, 435, 436, 438
See application file for complete search history.

(56) References Cited

U.S. PATENT DOCUMENTS

| | | | |
|---|---|---|---|
| 7,088,262 B2 | 8/2006 | Schindler et al. | |
| 7,248,153 B2 | 7/2007 | Danz et al. | |
| 7,528,740 B2 | 5/2009 | Hess et al. | |
| 8,289,189 B2 | 10/2012 | Becker et al. | |
| 10,167,016 B2 * | 1/2019 | Pla Rubio | B62D 15/0285 |
| 10,486,549 B2 * | 11/2019 | Ignaczak | G06T 11/00 |
| 2006/0287800 A1 * | 12/2006 | Watanabe | B62D 15/0275 |
| | | | 701/96 |

(Continued)

FOREIGN PATENT DOCUMENTS

| | | |
|---|---|---|
| EP | 1403659 A1 | 3/2004 |
| WO | 2012019941 A1 | 2/2012 |

*Primary Examiner* — Anh V La
(74) *Attorney, Agent, or Firm* — Frank L. Lollo; MacMillan, Sobanski & Todd, LLC (57) ABSTRACT

A parking assist system for a vehicle uses cameras to collect ground images at opposite edges of the vehicle. A speed sensor provides a speed signal representing a speed of the vehicle. When speed is less than a threshold, a navigation system compares a geographic location of the vehicle to map data or the camera images are monitored to detect parking zones. A parking controller is coupled to the cameras, a display panel, navigation system, and speed sensor. When the parking controller detects that the geographic location of the vehicle coincides with a parking zone then the parking controller 1) examines the ground images to recognize a pair of edge boundaries of a parking spot, 2) calculates a proportion of an intersection length of the vehicle contained within the boundaries to a full length of the vehicle, and 3) displays the calculated proportion as a percentage on the display panel.

20 Claims, 6 Drawing Sheets

(56) References Cited

U.S. PATENT DOCUMENTS

| | | | | |
|---|---|---|---|---|
| 2010/0253542 | A1* | 10/2010 | Seder | G01S 7/22 340/932.2 |
| 2014/0132208 | A1* | 5/2014 | Fisher | H02J 7/025 320/108 |
| 2015/0302750 | A1* | 10/2015 | Choi | G08G 1/143 340/932.2 |
| 2018/0093663 | A1* | 4/2018 | Kim | G08G 1/165 |

* cited by examiner

PARKING ASSIST SYSTEM WITH PARKING SPOT OCCUPANCY READOUT

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to parking assist systems for cars and trucks, and, more specifically, to camera-based guidance for parking a vehicle within the bounds of a demarcated parking spot.

Many areas, such as urban areas, shopping malls, and entertainment venues, have limited space for providing parking of motor vehicles. When laying out parking spots (i.e., stalls) within a parking zone or lot (in a process known as striping), the dimensions for straight-in, angle, and parallel parking are selected to make efficient use of the available space while providing sufficient room between vehicles for entry/egress. When particular parked vehicles violate the striping, it causes crowding of vehicles, loss of spots, and annoyance to other drivers. Especially when allocated spot sizes are reduced, it may be difficult to see the painted lines in order to correctly place a vehicle while parking. The problem can be even worse for larger vehicles such a pickup trucks and SUVs.

To assist drivers while parking, many vehicles use backup cameras with dashboard video displays. Nevertheless, drivers still experience difficulties in judging whether the vehicle has been optimally placed within a parking spot. In particular, the field-of-view when the camera is located well above ground level on a large vehicle might sometimes fail to include the parking stripe corresponding to the back edge of the vehicle when the vehicle is very close to it.

SUMMARY OF THE INVENTION

In one aspect of the invention, a parking assist system for a vehicle comprises first and second cameras collecting ground images at opposite edges of the vehicle. A display panel is visible to a driver of the vehicle. A navigation system compares a geographic location of the vehicle to map data identifying a plurality of geographic areas as parking zones. A speed sensor provides a speed signal representing a speed of the vehicle. A parking controller is coupled to the cameras, display panel, navigation system, and speed sensor. When the parking controller detects that the geographic location of the vehicle coincides with a parking zone and the speed signal is less than a predetermined speed then the parking controller 1) examines the ground images to recognize a pair of edge boundaries of a parking spot, 2) calculates a proportion of an intersection length of the vehicle contained within the boundaries to a full length of the vehicle, and 3) displays the calculated proportion as a percentage on the display panel.

DETAILED DESCRIPTION OF PREFERRED EMBODIMENTS

In general, the invention may use a vehicle GPS/Navigation system to detect that the vehicle is entering into a parking zone (e.g., parking lot, parking structure, or marked parking along a street). The vehicle may also use its camera system to determine if the vehicle is entering into a parking zone, based on various features in the scenes captured. The camera view would not be available for display during this judgement process. The parking zone can also include a garage stall at a home of a driver.

When the vehicle speed drops below a certain speed (e.g., 5 mph), the vehicle opens both front camera and rear camera view and displays as a split-view to the driver on a cockpit display (e.g., a display panel on the dashboard). A parking control module analyzes the camera views and calculates a front-to-back parking position percentage (PPP) based on the vehicle position and the parking spot edges. Whenever the PPP value is below a threshold value (e.g., 80%), the driver is alerted via a color-coded display or other means. The parking module can also provide the driver with side-to-side position information within the parking spot to help the driver to adjust the vehicle.

The use of a GPS/Navigation system to detecting a parking zone is used as a criteria for triggering parking assistance in order to avoid triggering the assistance feature while the vehicle is moving slowly in traffic or waiting for light on the road. When the vehicle is in a parking zone but its speed is above 5 mph, the feature turns off automatically since the vehicle would be leaving the parking spot. For vehicles bigger (longer) than the size of the parking spot, the driver can always adjust the vehicle until it reaches a highest PPP value available. When a vehicle is crossing a middle line between two adjacent spots or any marking for an edge of a parking spot becomes obscured, the parking module can continue to track the middle line position or other marking relative to the vehicle using dead reckoning information (e.g., wheel rotation). Thus, the PPP value can continue to be updated.

Figure 1:
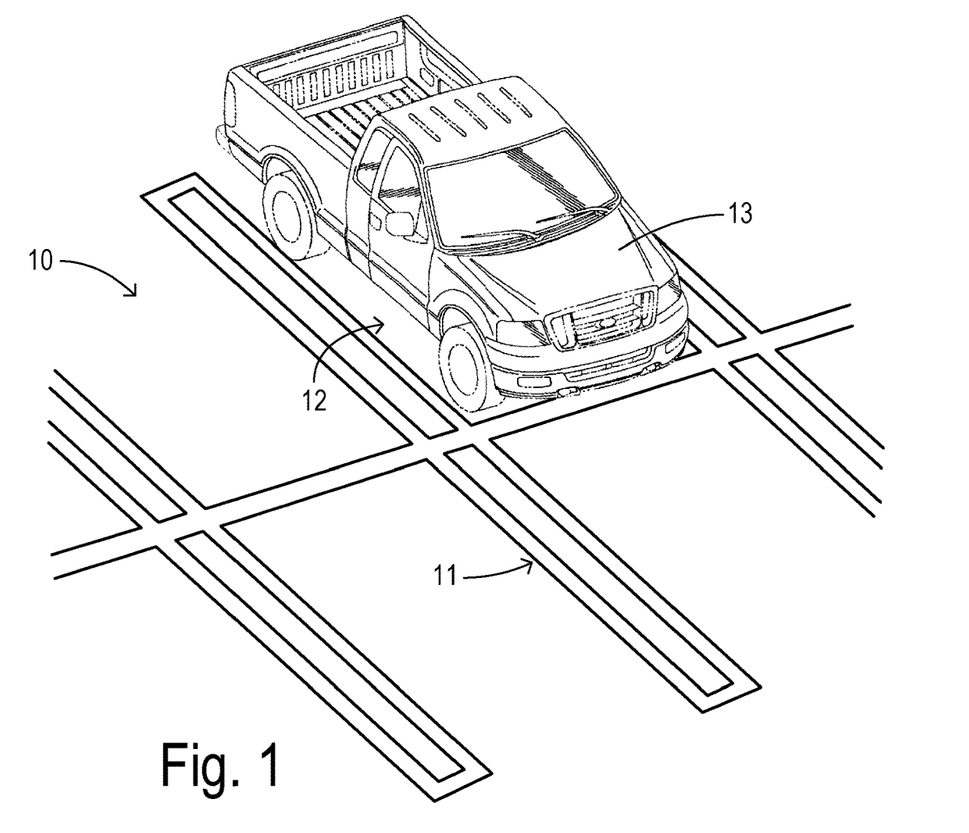
FIG. 1 is a perspective view of a vehicle within a striped parking spot.
Figure 2:
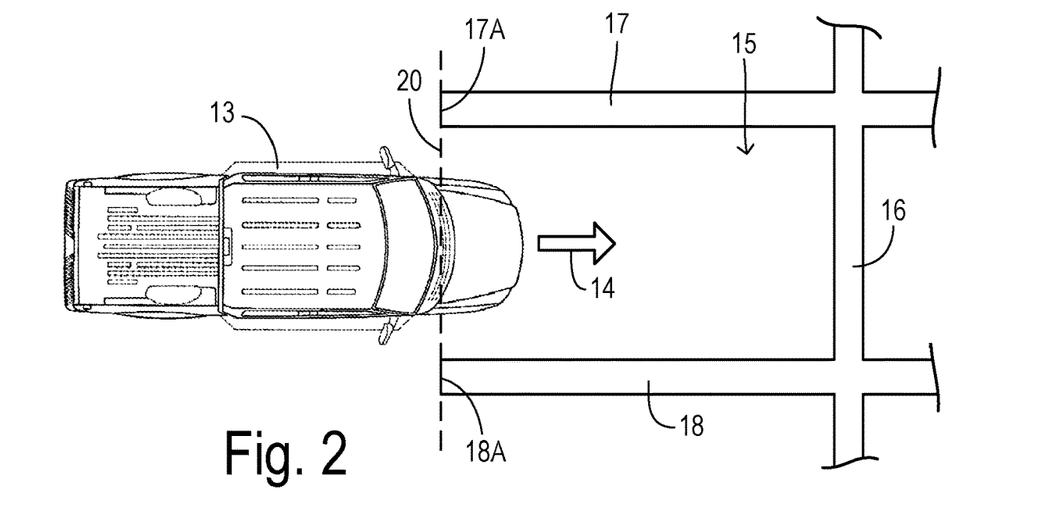
FIG. 2 is a top view of the vehicle of FIG. 1 entering the parking spot.

Referring now to FIG. 1, a parking zone (e.g., parking lot) 10 includes painted stripes 11 demarking a plurality of parking spots including a parking spot 12 where a vehicle 13 is parked. In FIG. 2, vehicle 13 is seen moving forward along a travel direction 14 into a parking spot 15 with edge boundaries defined by an end stripe 16 providing a forward edge and side stripes 17 and 18 which terminate at remote end 17a and 18a to define a rearward edge 20 of the boundaries.

Figure 3:
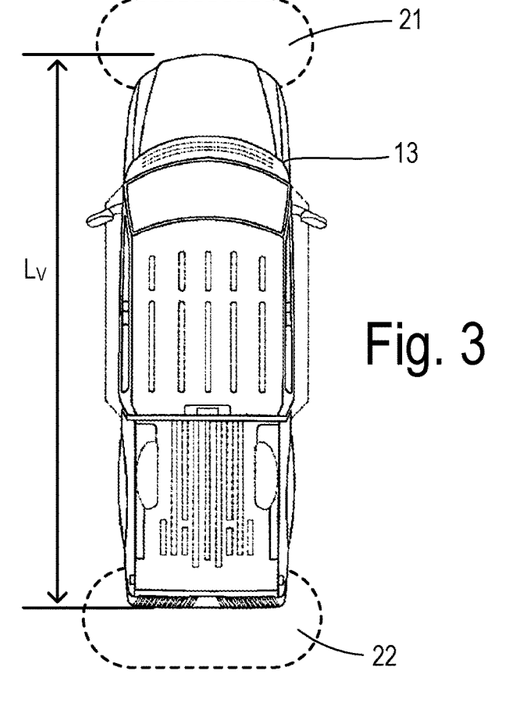
FIG. 3 is a top view of the vehicle identifying fields of view of the cameras.
Figure 4:
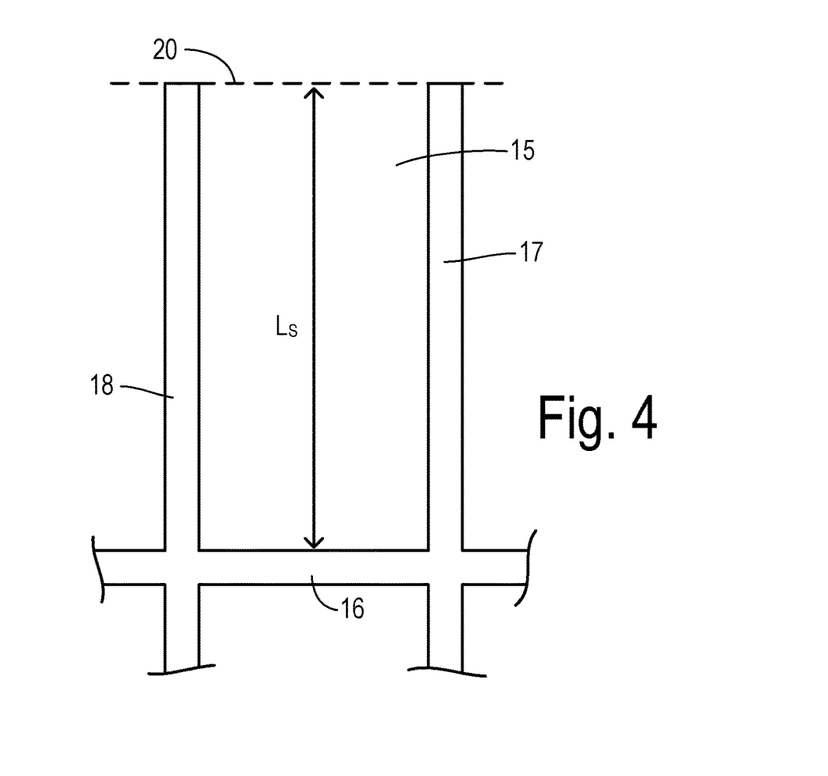
FIG. 4 is a top view identifying dimensions of a straight-in parking spot.
Figure 5:
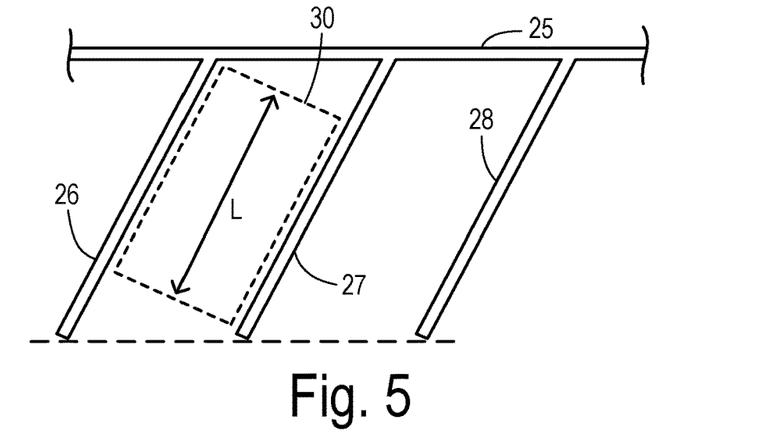
FIGS. 5-7 are diagrams showing alternate configurations of parking spots including angled and parallel parking.
Figure 6:
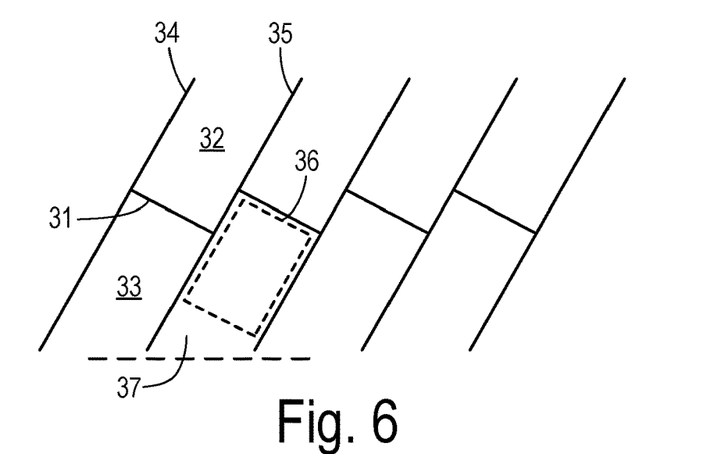

As shown in FIG. 3, vehicle 13 has a vehicle length $L_V$ between front and back ends of vehicle 13. Front and rear cameras installed in vehicle 13 provide a frontward field of view 21 and a rearward field of view 22. FIG. 4 shows a corresponding edge-to-edge distance $L_S$ of parking spot 15. Since parking spot 15 is a straight-in parking spot with a rectangular shape, length $L_S$ can be determined directly from the painted stripe features. More generally, geometric processing may be needed in order to determine the effective edge-to-edge distance for an arbitrary parking spot. For example, FIG. 5 shows angled parking wherein striping includes a center line 25 and side lines 26-28. The present invention preferably uses pattern recognition to detect striping features which demarcate a parking spot and then finds the largest rectangle 30 that fits within the demarcated parking spot. The edge-to-edge distance $L_S$ of the parking spot corresponds to a length L of largest rectangle 30. FIG. 6 shows a similar angled arrangement wherein a separation line 31 between facing parking spots 32 and 33 is angled to be transverse to side lines 34 and 35. Thus, finding a largest rectangle 36 in a parking spot 37 would be simplified.

Figure 7:
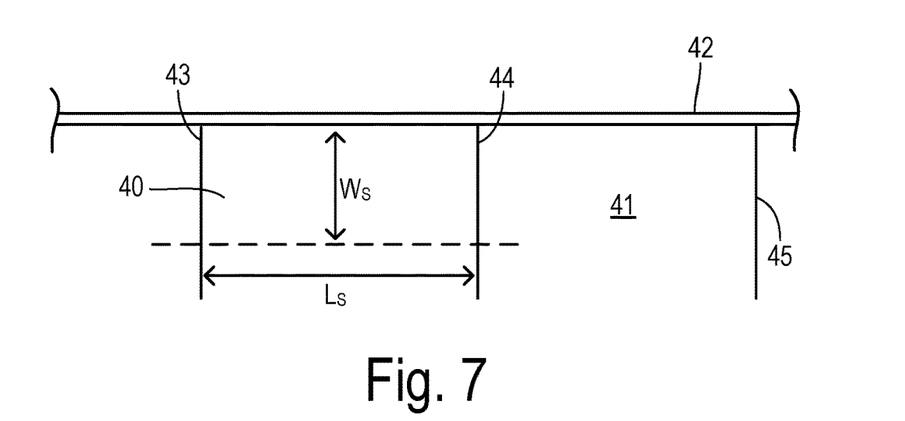

FIG. 7 shows a parallel parking situation wherein spots 40 and 41 are laid out along a curb 42 and are demarcated by painted stripes 43, 44, and 45. Parking spot 40 has a length $L_S$ between lines 43 and 44 and a width Ws defined by curb 42 and the remote ends of lines 43 and 44, for example.

Figure 8:
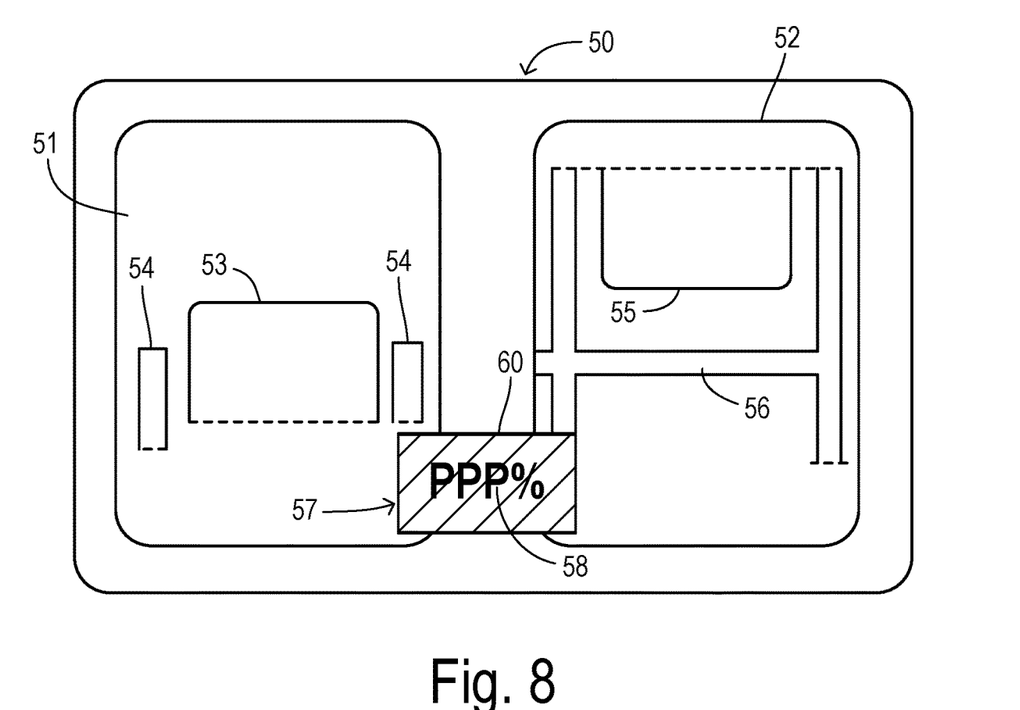
FIG. 8 is a plan view showing a screen display of the invention.
Figure 12:
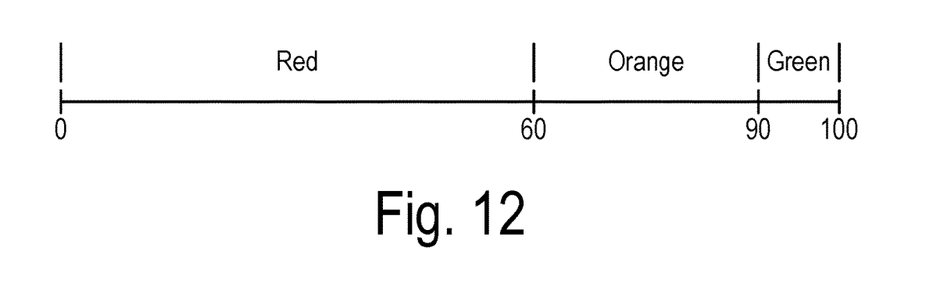
FIG. 12 is a plot showing predetermined ranges to be indicated by color-coding of a screen display.

FIG. 8 shows a display panel 50 for providing parking assistance to a driver of a vehicle according to various embodiments of the invention. Display panel 50 preferably shows a split-screen view having ground images of the vehicle and surroundings. A rear camera image in a window 51 shows a back portion 53 of the vehicle together with surroundings including parking stripes 54. A second window 52 shows a front portion 55 of the vehicle together with parking stripes 56. To supplement these direct views for guiding a driver to properly locate the vehicle within the corresponding parking spot, the invention provides a parking position percentage (PPP) readout 57 which displays a calculated proportion (i.e., ratio) of an edge-to-edge distance of the vehicle contained within the edge boundaries of a parking spot. The calculated proportion preferably includes a percentage which is displayed as a numerical symbol or text 58. In addition, a color-coded region 60 is provided which produces one of a plurality of colors, wherein each color corresponds to a respective predetermined range of the percentage. The displayed color is selected according to the respective range within which the numerical PPP resides. FIG. 12 shows preferred ranges, wherein a PPP value over 90% corresponds to a background (i.e., fill area) of readout 57 having a green color. A PPP value between 60% and 90% corresponds to orange, and a PPP value less than 60% corresponds to red.

Figure 9:
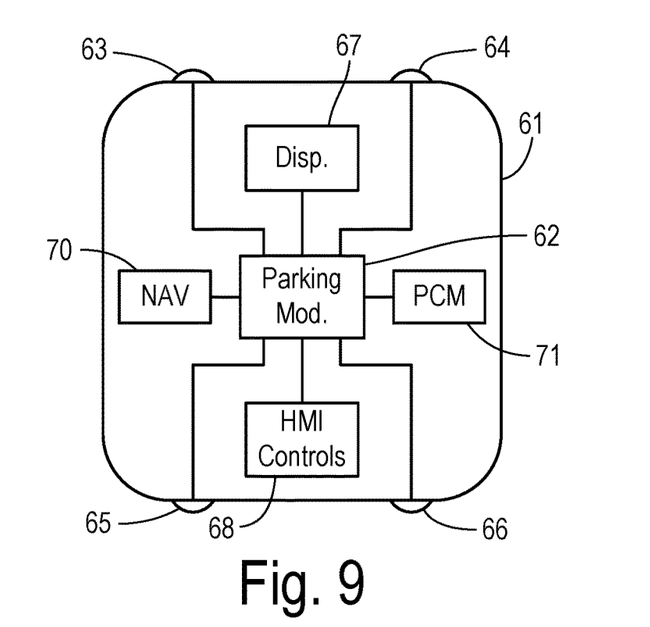
FIG. 9 is a block diagram according to one preferred embodiment.

FIG. 9 shows a vehicle apparatus 61 for implementing one preferred embodiment of the invention. A parking control module 62 receives images depicting the ground and other surroundings from a plurality of cameras, such as front cameras 63 and 64 and rear cameras 65 and 66. A display panel 67 is visible to the driver of vehicle 61, and may preferably include a video display with touchscreen input capability. Additional HMI controls 61 may also be connected to parking control module 62 such as a button pad or control knobs. A vehicle GPS/navigation system 70 is coupled to parking control module 62 for providing geographic location information (i.e., coordinates) and for notifying parking module 62 when the geographic location of the vehicle coincides with a parking zone, as described below. The parking module 62 may also use camera inputs to determine if the vehicle is entering a parking zone, without opening the camera view. A powertrain control module (PCM) 71 is coupled to parking control module 62 for providing a speed signal representing a speed at which the vehicle is moving. Wheel rotation and/or other dead reckoning information can also be provided from navigation system 70, PCM 71, or other vehicle modules, as known in the art.

Parking control module 61 may preferably comprise a microcontroller adapted to perform the calculations described herein. It can be a stand-alone unit or can be incorporated with other vehicle functions such as in a body control module (BCM) or in navigation module 70 or PCM 71.

Figure 10:
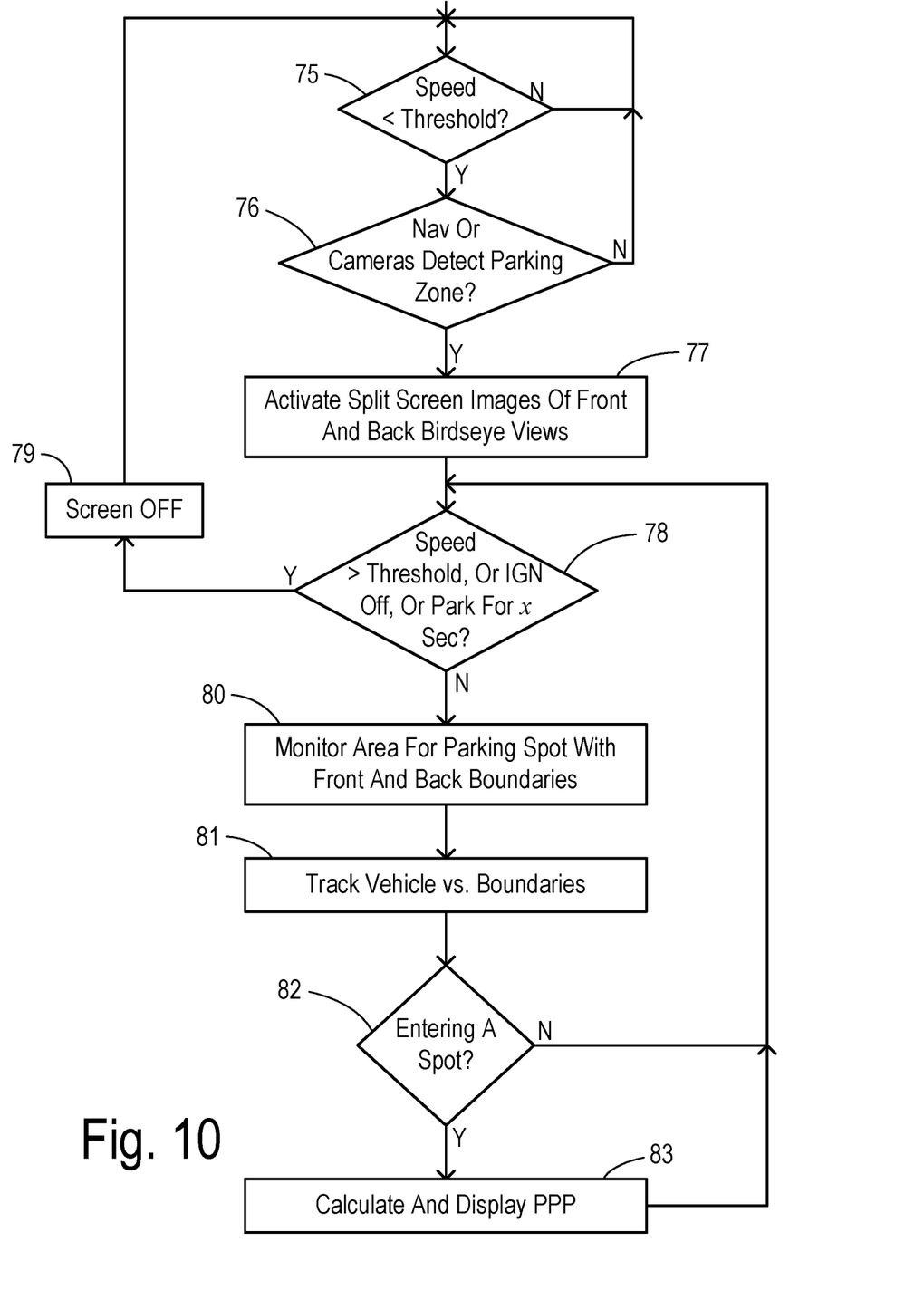
FIG. 10 is a flowchart showing one preferred method of the invention.

A preferred method is shown in FIG. 10 which is operates when a vehicle is in use. In step 75, the parking controller and/or navigation system periodically checks to determine whether the speed signal is less than a speed threshold (e.g., 5 mph). If the speed is greater than the threshold then the method continues to monitor the speed in step 75. The speed threshold preferably has a value within a range of about 3 mph to 7 mph, with a most preferred value of about 5 mph. The driver would not be expected to be trying to park the vehicle when moving at a speed above the threshold.

When the speed is less than the speed threshold, then checks whether the vehicle is in a parking zone in step 76. One preferred way of detecting a parking zone is to check whether the geographic location coordinates of the vehicle correspond with a parking zone, such as a parking lot. Parking zones may be defined in a publicly available map database utilized by the GPS/navigation system which comprises a compilation of road segments and points-of-interest. The map data identifying the parking zones can also include areas along the side of a street which have been designated for vehicle parking (e.g., as identified in the map database). In addition, the map data for detecting a parking zone may include user-configured coordinates that have been manually set by the user. For example, while a vehicle is located in a garage at the home of the user, the coordinates can be stored as a parking zone in response to a user command. Thereafter, the feature can be evoked when the vehicle approaches the garage to be parked. The parking controller may also use camera inputs when the vehicle speed is below a threshold to determine if the vehicle is entering a parking zone.

Whenever a parking zone has been detected, then the split-screen display is activated to show the ground images for the front and back of the vehicle as birds eye views in step 77. In step 78, certain checks are performed to determine whether the driver is no longer actively parking the vehicle such that the parking assist feature should be discontinued. For example, if the speed is greater than the speed threshold, or the vehicle ignition has been turned off, or the transmission gear selector has been placed in a Park position for greater than a predetermined time (x seconds), then the screen is turned off in step 79 and the method returns to the beginning.

If the feature is not deactivated in step 78, then the method continues with monitoring the ground images showing the surrounding area in order to detect a parking spot with discernible edge boundaries (preferably front and back boundaries of a parking spot). Using known image processing and vehicle tracking algorithms, the vehicle position and the edge boundaries of the parking spot are detected within the images and tracked in step 81. For example, ground images can be examined to extract features such as straight lines, ends of lines, and combinations of lines that indicate edge boundaries of a parking spot via painted stripes or curbs. Once boundaries of a parking stop are detected, a check can be performed in step 82 to determine whether the vehicle is entering a detected parking spot. If not, then a return is made to step 78, and monitoring is continued. When entry into a parking spot is not detected, then a PPP value of 0% may be shown on the display. When a parking spot is being entered, then the method calculates and displays the PPP value in step 83.

In particular, the invention calculates a proportion of an edge-to-edge distance of the vehicle which is contained within the boundaries compared to the overall vehicle length. In a main embodiment, the edge boundaries are comprised of a forward edge and a rearward edge of a parking spot (the front and back corresponding to front and back ends of the vehicle along a direction of travel into the parking spot). In an alternative embodiment, the edge boundaries can be left-side and right-side boundaries of a parking spot, so that parking assistance can be provided with respect to the lateral right-to-left position of the vehicle within the parking spot. In any event, the edge boundaries may or may not be directly associated with a painted stripe or curb. If a detected parking spot is other than a rectangle (i.e., with 90° corners), then the edge boundaries are determined according to a largest rectangle that fits within the extended features (stripes or curbs) that demarcate the parking spot.

Figure 11A:
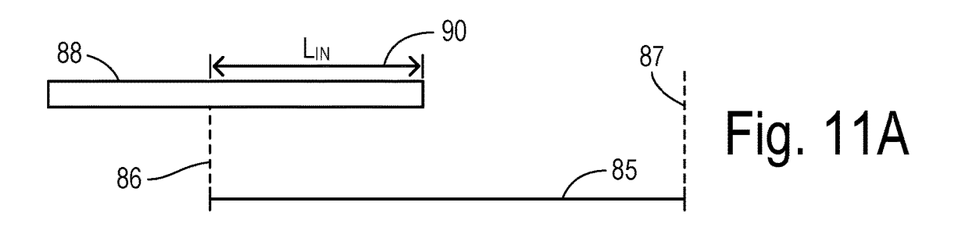
FIGS. 11A, 11B, and 11C are diagrams illustrating different proportions of a vehicle contained within boundaries of parking spots.

As shown in FIG. 11A, a vehicle front-to-back profile 88 is entering a parking spot 85 with edge boundaries 86 and 87. Profile 88 is straddling edge boundary 88 such that an intersection length $L_{IN}$ 90 is observed. The calculated proportion is defined as intersection length $L_{IN}$ 90 divided by the full vehicle length $L_V$. Preferably, the proportion is displayed as a percentage as follows:

$$\frac{L_{IN}}{L_V} \times 100\%.$$

Figure 11B:
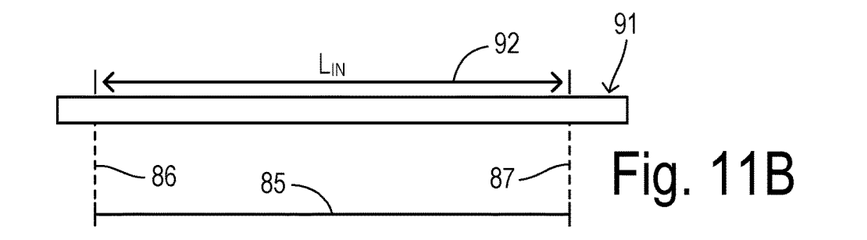

In the situation shown in FIG. 11B, an edge-to-edge length between edge boundaries 86 and 87 of parking spot 85 may be less than the full vehicle length $L_V$. In that instance, a vehicle profile 91 straddles both edges. An intersection length $L_{IN}$ 92 corresponds to the maximum length of parking spot 85, and thus corresponds to the best PPP value even though it is less than 100%.

Figure 11C:
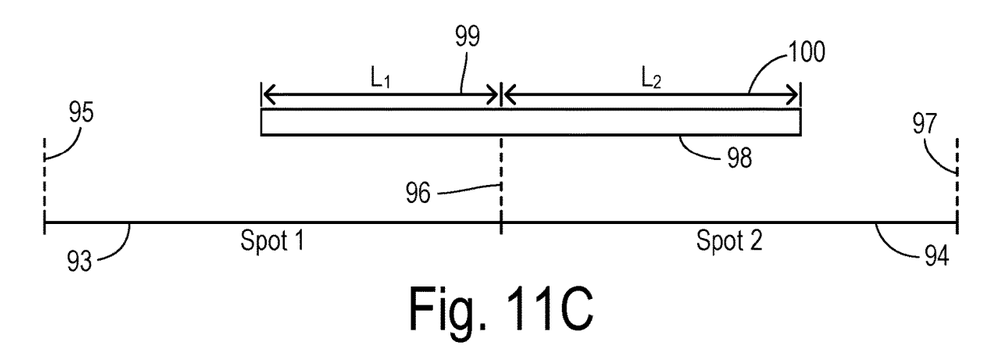

FIG. 11C shows a vehicle profile 98 as a vehicle is moving over end-to-end parking spots 93 and 94 defined by edge boundaries 95, 96, and 97. A first portion 99 of the vehicle located in parking spot 93 has an intersection length $L_1$, and a second portion 100 of the vehicle located in parking spot 94 has an intersection length L2. Preferably, the PPP readout shows the greater of the two PPP values to reflect the degree of success being achieved in locating the vehicle within a single parking spot.

What is claimed is:

1. A parking assist system for a vehicle comprising:
   first and second cameras collecting ground images at opposite edges of the vehicle;
   a display panel visible to a driver of the vehicle;
   a navigation system comparing a geographic location of the vehicle to map data identifying a plurality of geographic areas as parking zones;
   a speed sensor providing a speed signal representing a speed of the vehicle; and
   a parking controller coupled to the cameras, display panel, navigation system, and speed sensor, wherein when the parking controller detects that the geographic location of the vehicle coincides with a parking zone and the speed signal is less than a predetermined speed then the parking controller:
   examines the ground images to recognize a pair of edge boundaries of a parking spot;
   calculates a proportion of an intersection length of the vehicle contained within the boundaries to a full length of the vehicle, and
   displays the calculated proportion as a percentage on the display panel.

2. The system of claim 1 wherein the predetermined speed is selected within a range from 3 to 7 miles per hour.

3. The system of claim 1 wherein the parking controller uses the ground images to separately detect a parking zone.

4. The system of claim 1 wherein the edge boundaries are comprised of a forward edge and a rearward edge corresponding to front and back ends of the vehicle along a direction of travel into the parking spot.

5. The system of claim 1 wherein the percentage is displayed as a numerical symbol.

6. The system of claim 5 wherein the parking controller generates a color-coded region on the display panel producing one of a plurality of colors corresponding to a plurality of predetermined ranges of the percentage, respectively, within which the percentage resides.

7. The system of claim 1 wherein the display panel further displays the ground images simultaneously with the percentage.

8. The system of claim 1 wherein the map data is comprised of a compilation of road segments and points-of-interest.

9. The system of claim 1 wherein the map data includes user configured coordinates.

10. The system of claim 1 wherein the parking controller recognizes the pair of edge boundaries by detecting at least two extended features within the ground images, and identifying a largest rectangle that fits within the extended features.

11. The system of claim 10 wherein the parking controller tracks a location of an extended feature using a dead reckoning if the extended feature moves outside of a field of view of the cameras.

12. A parking assist method for a vehicle, comprising the steps of:
   sensing a speed signal representing a speed of the vehicle;
   when the speed signal is less than a predetermined speed, comparing a geographic location of the vehicle to map data identifying a plurality of geographic areas as parking zones;
   when the geographic location of the vehicle coincides with a parking zone then:
   capturing ground images using cameras mounted on the vehicle at first and second opposing edges of the vehicle;
   recognizing a pair of edge boundaries of a parking spot in the ground images in response to pattern recognition of at least one striping feature in the captured ground images;
   calculating a proportion of an intersection length of the vehicle contained within the edge boundaries to a full length of the vehicle; and displaying the calculated proportion as a percentage on a display panel in the vehicle.

13. The method of claim 12 wherein the geographic location of the vehicle coinciding with a parking zone is further detected in response to features in the ground images.

14. The method of claim 12 wherein the predetermined speed is selected within a range from 3 to 7 miles per hour.

15. The method of claim 12 wherein the edge boundaries are comprised of a forward edge and a rearward edge corresponding to front and back ends of the vehicle along a direction of travel into the parking spot.

16. The method of claim 12 wherein the percentage is displayed as a numerical symbol, and wherein a color-coded region is generated on the display panel producing one of a plurality of colors corresponding to a plurality of predetermined ranges of the percentage, respectively, within which the percentage resides.

17. The method of claim 12 wherein the ground images are simultaneously displayed on the display panel with the percentage.

18. The method of claim 12 wherein the map data is comprised of a compilation of road segments and points-of-interest, and wherein the map data includes user configured coordinates.

19. The method of claim 12 wherein the step of recognizing the pair of edge boundaries is comprised of:
  detecting at least two extended features within the ground images; and
  identifying a largest rectangle that fits within the extended features.

20. The method of claim 19 further comprising the step of tracking a location of an extended feature using a dead reckoning if the extended feature moves outside of a field of view of the cameras.

* * * * *